United States Patent [19]

Kreuz

[11] 4,049,986
[45] Sept. 20, 1977

[54] ROTATIONAL SPEED TO IMPULSE FREQUENCY CONVERTER

[75] Inventor: Alois Kreuz, Maintal, Germany

[73] Assignee: VDO Adolf Schindling AG, Frankfurt am Main, Germany

[21] Appl. No.: 674,505

[22] Filed: Apr. 7, 1976

[30] Foreign Application Priority Data

Apr. 14, 1975   Germany .............................. 2516193

[51] Int. Cl.² ......................... H02K 11/00; H01H 9/00
[52] U.S. Cl. .................................. 310/68 B; 310/88; 335/205
[58] Field of Search ....................... 335/205, 153, 229; 310/87, 88, 156, 69, 68 A, 68 B, 68 E, 70 A, 70 R, 71, 168–170, 103; 200/19 M

[56] References Cited

U.S. PATENT DOCUMENTS

| 2,929,896 | 3/1960 | Ronning ............................... 335/205 |
| 2,932,703 | 4/1960 | Haberland ........................ 335/205 X |
| 3,261,944 | 7/1966 | Sherwood ..................... 335/205 UX |
| 3,500,082 | 3/1970 | Tolegian ............................. 310/88 X |
| 3,823,328 | 7/1974 | Barton et al. .................... 335/205 X |
| 3,961,604 | 6/1976 | Shimrony ......................... 335/205 X |

Primary Examiner—Mark O. Budd
Attorney, Agent, or Firm—Otto John Munz

[57] ABSTRACT

An apparatus for converting the rotational speed of a shaft, particularly of the driving shaft of a log propeller shaft into a proportional impulse frequency is provided with a rotary permanent magnet, means to couple it with the shaft, and at least one magnetically actuated switch positioned within the effective range of the permanent magnet, these electrical elements being arranged in a liquidproof housing of an improved construction simultaneously contributing to an optimum space saving arrangement of all parts involved.

9 Claims, 1 Drawing Figure

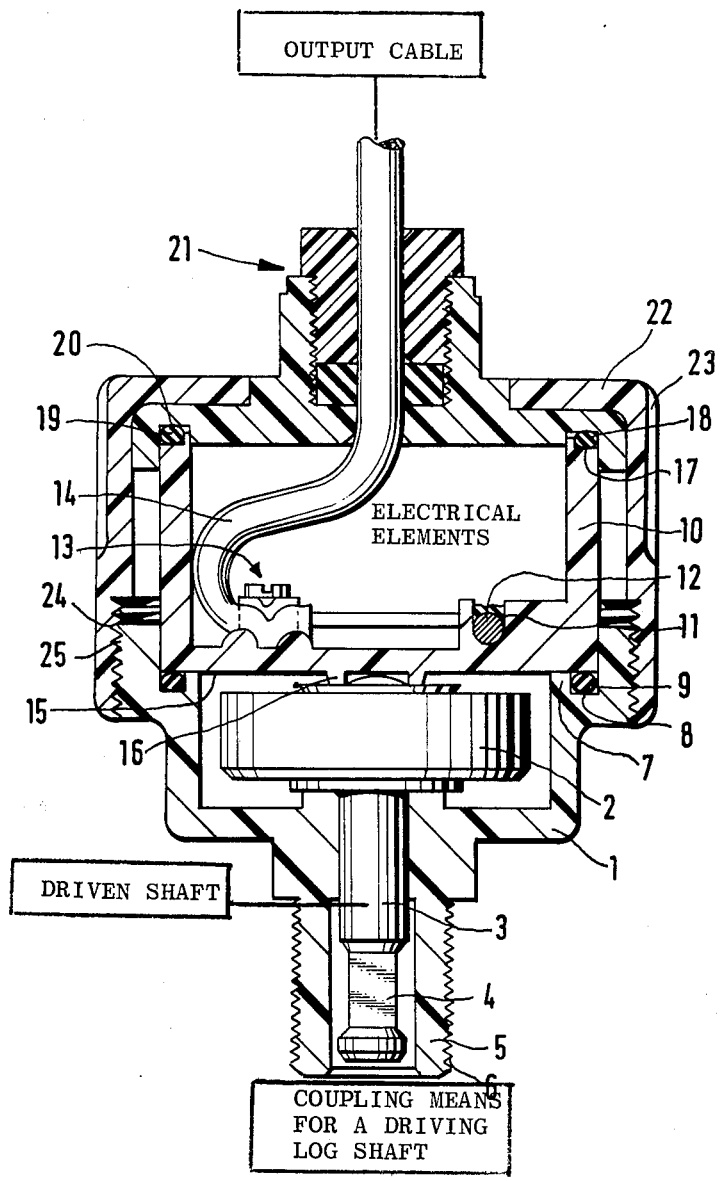

ROTATIONAL SPEED TO IMPULSE FREQUENCY CONVERTER

CROSS-REFERENCE TO RELATED APPLICATIONS

Priority of German application No. P 25 16 193.7, filed Apr. 14, 1975 is claimed under the Convention.

FIELD OF ART

Convertors of speed of a rotating shaft into impulse frequency.

DESCRIPTION OF THE PRIOR ART

In the devices of the prior art the rotary permanent magnet and the magnetic switch or switches are arranged together in a housing from which protrudes a shaft section which supports the permanent magnet and which is provided with means to be connected with the shaft whose rotational speed is to be converted into an impulse frequency. These devices can be operated generally only in an electrically non-conductive medium, such as air. If operated in water, short circuits may occur in the electric portion of the apparatus should the water penetrate between the shaft and the housing to the inside of the housing.

While by means of suitable seal between the shaft and the housing the penetration of water to the inside of the housing could be avoided, such a seal would cause substantial torque losses which are progressively higher in proportion to the improvements of the sealing effect. Consequently, these devices cannot be used for converting the rotational speed of shafts yielding a relatively small torque, such as log propeller shafts.

Devices for converting the rotational speed of a shaft rotating in a liquid into an impulse frequency conventionally employ a permanent magnet mounted on the shaft with the magnetically actuated switch or switches arranged within the effective range of the magnet, but outside the housing that contains the liquid. Such designs can be employed only when the distances, occurring in operation, between the rotary permanent magnet and the magnetic switch or switches are not too large. Therefore these devices are not suitable for converting the rotational speed of a log propeller into an impulse frequency since in such a case the distance between the outboard rotating permanent magnet and the magnetic switch located on board would be too large.

It has also been proposed to couple the shaft rotating in a liquid with a flexible shaft whose free end protrudes from the water. This free end shaped so that it can be connected with a converter of the prior art described above has disadvantageous assembly requirements and is expensive, due to the use of a flexible shaft.

SUMMARY OF THE INVENTION

The objects of the invention are to provide a rotational shaft-speed- to impulse frequency small-torque-converter operating in a liquid such as water, which avoids the use of a conventional flexible shaft protruding from the water into a boat or ship to run the electrical circuitry and which has a minimum of parts;

which is watertight;

which has a sealing means between shaft and housing avoiding unnecessary friction and thus preventing torque losses;

which has a cooperative arrangement of the sealing means with the housing contributing simultaneously to create an improved space saving design with room inside of the housing for the electrical components of the device, such as a permanent magnet and switches, and which is dependable and inexpensive in manufacture, of a small structural volume and ease of assembly when compared with the analogous devices of the prior art.

Other objects and advantages of the invention will become obvious to those skilled in the art from the following specification, claims and appended drawings.

BRIEF DESCRIPTION OF THE DRAWINGS

The sole FIGURE of drawings is a cross-sectional view of the converter.

DESCRIPTION OF THE PREFERRED EMBODIMENTS

There are shown in longitudinal section a housing 1 with a shaft section 3 supporting a permanent magnet 2, rotatably mounted thereon. The shaft section at its free end extends into an inside square 4, for junction with an outside junction square of the rotational speed device, mounted on the shaft — whose rotational speed is to be converted into the impulse frequency. The inside square 4 rotates in a connecting pipe 5 and is provided with an external thread 6, molded to the housing.

The housing 1 is provided with a ring shoulder 7 which supports a cup-shaped insert 10. A sealing washer 9 preferably is mounted in a groove 8 of the shoulder.

On the inside base of the insert, in a holder fixture 11 molded thereon are provided:

a tubular magnetically actuated switch 12 and clasping means 13 for clamping the feeder cable 14 to the insert. The switch is mounted spaced from the rotational permanent magnet within the effective range of the magnet. An abutment ring 16 is molded on the outside base 15 of the insert, limiting the axial movement of the shaft section. The free end of the insert has a recess 17 holding another sealing washer 18.

The sealing washer supports a cover 19 which is provided with a groove 20 into which projects the free end of the insert with the sealing washer. The cover is equipped with a liquid tight cable passage 21.

The housing, the insert and the cover are held together by means of a screw collar ring 22 having a flange 23. The screw collar ring has on its free end an internal thread 24 which mates with an external thread 25 provided on the housing. By contact pressure produced between the individual structural elements by the screwed on collar to the housing a sealing effect is achieved of such magnitude that, even when the aparatus operates for a long time in a liquid, no liquid can enter the interior of the housing, which contains the electrical portion of the apparatus. Thus according to the invention the permanent magnet is rotatably mounted in a portion of the housing which has means to be coupled with the shaft and wherein the switch or switches are mounted on the inside base of the cup-shaped insert supported by a ring shoulder of the housing, while the insert is closed by the cover provided with a cable passage, and is held in the housing by means of the screw collar ring engaging the outside of the cover.

The converter of the invention can be connected directly to the driving shaft of a log propeller positioned under water, so that a flexible shaft between the aparatus and the driving shaft of the log propeller becomes superfluous. The apparatus permits a time-saving assembly and quick replacement of a non-functioning magnetic switch even by untrained persons.

The sealing washer is mounted between the cover and the insert in order to make sure that, even at an underwater operation extending over some length of time, no water can enter the chamber formed by the cover and the insert containing the electrical portion of the apparatus. For the same reason the sealing washer is provided between the outside base of the insert and the ring shoulder.

The screw collar that connects the insert closed by means of the cover with the housing, preferably is a sheet metal ring; the end of this ring that faces the housing part being flanged about an edge of the casing part. It is advantageous to provide the casing part with an external thread, and the screw collar ring at its open end with an internal thread. This enables, for instance for repair purposes, even untrained personnel to reach quickly without a tool the casing insert with the electronic element of the apparatus.

To hold the cover on the casing insert by means of the screw collar ring or by means of additional fastening means, such as screws, is a particularly inexpensive constructional solution. The latter solution entails the advantage that the insert and cover form a closed structural unit which can be readily replaced.

To facilitate the handling of the apparatus, it is advisable to provide the screw collar ring with a flange. In this manner it is furthermore possible, without additional tool, to screw-on the screw collar ring manually with the contact pressure, required for efficient sealing, between the individual casing parts.

The housing is made of plastic material and the bottom portion thereof between the magnet and the switch is magnetically permeable.

What is claimed is:

1. A rotational shaft-speed to impulse-frequency converter, such as for converting the speed of a driving underwater shaft of log into a proportional impulse frequency, comprising:
  a. a housing with a shaft orifice with a driven shaft, with means for coupling with an outside driving shaft;
  b. a cup-shaped watertight insert mounted within said housing having a base and a cover with a watertight cable orifice and a cable extending therethrough;
  c. a permanent magnet mounted for rotation on the driven shaft adjacent the said base of said insert;
  d. electrical components, including at least one magnetically actuated switch on the inside of said base of said insert within an effective range of said magnet;
  e. said housing, said insert and said cover comprising mounting means for a watertight mating mounting of their respective peripheries. said housing having an open top; said mounting means comprising: a ring shoulder in said housing; said insert supported by said ring shoulder; and a collar ring engaging the outside of said cover and holding said insert in said housing.

2. A converter as claimed in claim 1, further comprising: a sealing washer arranged between the outside base of the insert and the ring shoulder.

3. A converter as claimed in claim 1, further comprising:
  a sealing washer between the cover and the insert.

4. A converter as claimed in claim 1,
  said housing being cylindrical and provided with an external thread and the collar ring at its open end, with an internal thread.

5. A converter as claimed in claim 4,
  said collar ring being provided with a flange.

6. A converter a claimed in claim 1,
  the cover being fastened to the insert by means of a screw collar ring.

7. A converter as claimed in claim 1, further comprising additional fastening means connecting the cover and the insert.

8. A converter as claimed in claim 1,
  the said housing being cylindrical with an open top;
  the shaft orifice and the cable orifice being spaced from each other at the opposite ends of the housing;
  said insert with its cover forming a cylindrical cup shaped chamber for the electrical components and being interposed between said magnet and said cover.

9. A converter as claimed in claim 8, said housing having an external thread at its upper periphery;
  said collar having an internal thread at its lower periphery adjacent the upper periphery of said housing and mating with its external thread;
  said housing with said magnet, said insert with said switch and said cover being screwed together watertight under compression.

* * * * *